US012807824B2

United States Patent

Griesser et al.

(10) Patent No.: US 12,807,824 B2

(45) Date of Patent: Nov. 24, 2026

(54) ARTICLE HAVING A BIOCIDAL COATING, METHOD OF COATING AN ARTICLE AND USE OF A BIOCIDAL COATING

(71) Applicant: MONTANUNIVERSITÄT LEOBEN, 8700 (AT)

(72) Inventors: Thomas Griesser, St. Peter Freienstein (AT); Wolfgang Kern, Leoben (AT); Thomas Rockenbauer, Leoben (AT); Romana Schwarz, Leoben (AT); Delara Hartmann, Leoben (AT)

(73) Assignee: MONTANUNIVERSITÄT LEOBEN, Leoben (AT)

( * ) Notice: Subject to any disclaimer, the term of this patent is extended or adjusted under 35 U.S.C. 154(b) by 1058 days.

(21) Appl. No.: 17/995,279

(22) PCT Filed: Mar. 31, 2021

(86) PCT No.: PCT/EP2021/058447

§ 371 (c)(1),
(2) Date: May 17, 2023

(87) PCT Pub. No.: WO2021/198338

PCT Pub. Date: Oct. 7, 2021

(65) Prior Publication Data

US 2023/0279239 A1 Sep. 7, 2023

(30) Foreign Application Priority Data

Apr. 2, 2020 (AT) .............................. A 60090/2020

(51) Int. Cl.

*C09D 5/14* (2006.01)
*C08J 7/06* (2006.01)

(52) U.S. Cl.

CPC ................. *C09D 5/14* (2013.01); *C08J 7/06* (2013.01); *C08J 2387/00* (2013.01)

(58) Field of Classification Search

None

See application file for complete search history.

(56) References Cited

U.S. PATENT DOCUMENTS 11,864,964 B2 * 1/2024 Esquivel-Upshaw ........................ A61C 8/0013
2005/0008676 A1 * 1/2005 Qiu ........................ G02B 1/043 424/618

(Continued)

FOREIGN PATENT DOCUMENTS

CN 103555079 B 2/2014
EP 2374354 A1 10/2011

(Continued)

OTHER PUBLICATIONS

International Search Report for PCT/EP2021/058447 dated Jun. 18, 2021, 7 pages.

(Continued)

*Primary Examiner* — Peter A Salamon

(74) *Attorney, Agent, or Firm* — Womble Bond Dickinson (US) LLP

(57) ABSTRACT

The present invention relates to an article comprising a polymer, in particular a photopolymer, having a biocidal coating, wherein a biocidal component adheres to the polymer by means of a functional group of the polymer. The present invention further relates to a method of coating an article and an article obtainable thereby having a biocidal coating, as well as the use of a biocidal coating.

17 Claims, 4 Drawing Sheets

(56) References Cited

U.S. PATENT DOCUMENTS

| | | | | |
|---|---|---|---|---|
| 2008/0203592 A1* | 8/2008 | Qiu | G02B 1/043 | 264/2.6 |
| 2011/0256510 A1* | 10/2011 | Pashley | A61K 6/887 | 514/642 |
| 2013/0108708 A1* | 5/2013 | Xu | A61K 6/17 | 977/773 |
| 2016/0058675 A1* | 3/2016 | Xu | A61K 6/818 | 424/78.35 |
| 2020/0236946 A1* | 7/2020 | Horino | A01N 59/20 | |

FOREIGN PATENT DOCUMENTS

| | | |
|---|---|---|
| WO | WO 02/070022 A1 | 9/2002 |
| WO | WO 2019/074121 A1 | 4/2019 |
| WO | WO 2020/045413 A1 | 3/2020 |

OTHER PUBLICATIONS

Written Opinion for PCT/EP2021/058447 dated Jun. 18, 2021, 7 pages.
Akbarzadeh, et al. "An overview application of silver nanoparticles in inhibition of herpes simplex virus," Artificial Cells, Nanomedicine, and Biotechnology 46 (2), 2017, 6 pp.
Borkow, et al. "Copper as a Biocidal Tool," Current Medicinal Chemistry, 12 (18), 2005, pp. 2163-2175.
Borkow, et al. "Copper, An Ancient Remedy Returning to Fight Microbial, Fungal and Viral Infections," Current Chemical Biology, 3 (3), 2009, pp. 272-278.
Botequim, et al. "Nanoparticles and surfaces presenting antifungal, antibacterial and antiviral properties," Langmuir ACS Journal of Surfaces and Colloids 28 (20), 2012 pp. 7646-7656.
Galdiero, et al. "Silver nanoparticles as potential antiviral agents," Molecules (Basel, Switzerland) 16 (10), 2011, pp. 8894-8918.
Ge et al. "Nanosilver particles in medical applications: synthesis, performance, and Toxicity," International Journal of Nanomedicine 9, 2014, pp. 2399-2407.
Hsu et al. "Mechanism of inactivation of influenza viruses by immobilized hydrophobic polycations," Proceedings of the National Academy of Sciences, 108(1), Jan. 4, 2011, 61-66.
Xiong, et al. "Synthesis of highly stable dispersion of nanosized copper particles using L-ascorbic acid." Green Chem. 13 (900), 2011, pp. 900-904.
European Search Report for European Patent Application No. 21 716 358.3, dated Mar. 14, 2025, 14 pages.

* cited by examiner

ARTICLE HAVING A BIOCIDAL COATING, METHOD OF COATING AN ARTICLE AND USE OF A BIOCIDAL COATING

This application is the U.S. national phase of International Application No. PCT/EP2021/058447 filed 31 Mar. 2021 which designated the U.S. and claims priority to Austrian Patent Application No. A 60090/2020 filed 2 Apr. 2020, the entire contents of each of which are hereby incorporated herein by reference.

FIELD OF THE INVENTION

Embodiments of the invention relate to biocidal coatings for polymers, in particular photopolymers. These coatings may be capable of significantly reducing the microbial count or selectively deactivating viruses on the surface of photopolymers. More particularly, the present invention relates to an article comprising a polymer, in particular a photopolymer, having a biocidal coating, to a method of coating an article and to an article having a biocidal coating obtainable thereby, and to the use of a biocidal coating.

BACKGROUND

Photopolymers are generally formed by UV-induced polymerization of mono-, bi-, or multifunctional monomers or oligomers. In addition, photoreactive resin systems generally contain suitable photoinitiators and various additives (dispersing, leveling and slip additives, UV-VIS absorbers, stabilizers, fillers, color pigments). Irradiation of these reactive systems with actinic radiation (mostly UV light, but also electron radiation or X-rays) leads to crosslinking of the monomers/oligomers and the formation of a three-dimensional polymer network and thus to curing of the system.

The market for photopolymers is growing continuously and is opening up more and more new fields. UV-polymerizing reactive systems are used, for example, as UV-curing ink systems for graphic printing, as coatings for surfaces of all kinds (e.g. furniture, flooring, etc.) or for the production of three-dimensional structures by means of 3D ink-jet printing or stereolithography. These additive manufacturing technologies, which are based on the photopolymerization of liquid resins, have great potential for the production of customized molded parts for the manufacturing industry (e.g. automotive, aerospace, medical field), where high accuracy of fit and high surface quality are required.

Surfaces of articles with frequent skin contact, such as door knobs, door handles, grab handle in public transport or even children's toys, to name just a few examples, can be an ideal starting point for the spread of pathogenic microorganisms and viruses. One way to decimate the number of pathogenic bacteria and viruses on surfaces is to use antimicrobial and antiviral coatings.

The biocidal properties of such coatings are often based on the following mechanisms:

1) Immobilization of Copper Particles:

(Literature: Borkow, Gadi; Gabbay, Jeffrey (2009): Copper, An Ancient Remedy Returning to Fight Microbial, Fungal and Viral Infections. In: Current Chemical Biology 3 (3), pp. 272-278; Borkow, Gadi; Gabbay, Jeffrey (2005): Copper as a biocidal tool. In: Current medicinal chemistry 12 (18), pp. 2163-2175).

Copper exhibits potent antiviral (virucidal) activity. Inactivation of the following enveloped or non-enveloped single- or double-stranded DNA or RNA viruses by copper and copper compounds has been reported: bacteriophages, infectious bronchitis virus, poliovirus, Junin virus, herpes simplex virus, human immunodeficiency virus type 1 (HIV-1), West Nile virus, Coxsackie virus types B2 and B4, echovirus 4, and simian rotavirus SA11. More recently, inactivation of influenza A, rhinovirus 2, yellow fever, measles, respiratory syncytial virus, parainfluenza 3, Punta Toro, pichinde, adenovirus type 1, cytomegalovirus, and vaccinia has been demonstrated. Copper exerts its toxicity against microorganisms through several parallel mechanisms (see FIG. 4). It can lead to the death of microorganisms within minutes after exposure to copper. It is likely that initially the envelope of the microorganisms is damaged by copper. In general, metals in high concentrations have a toxic effect on microorganisms. The toxicity occurs through the following different mechanisms:

- By displacing essential metals from their native binding sites or by ligand interactions. In general, non-essential metals bind with greater affinity to thiol-containing groups and oxygen sites than essential metals.
- Toxicity also results from changes in the conformational structure of nucleic acids and proteins, as well as disturbances in oxidative phosphorylation and osmotic balance. The redox properties exhibited by some metals such as copper may also contribute to their inherent toxicity.

For example, as shown in FIG. 4, a redox reaction between $Cu^{2+}$ and $Cu^{1+}$ can catalyze the production of highly reactive hydroxyl radicals that can subsequently damage lipids, proteins, DNA, and other biomolecules. In contrast to the different resistance mechanisms to copper and other heavy metals in bacteria, fungi and other microorganisms, viruses lack resistance or repair mechanisms, making them highly susceptible to high concentrations of copper ions. Viruses lack DNA repair mechanisms, permeability barriers, intracellular and extracellular sequestration of metals by cell envelopes, efflux pumps for active metal transport membranes, and enzymatic metal detoxification mechanisms found in bacteria and cells. The reduced ability of viruses to resist copper could therefore explain their high sensitivity to this metal.

2) Immobilization of Quaternary Ammonium Compounds:

(Literature: Hsu, B. B., Yinn Wong, S., Hammond, P. T., Chen, J., & Klibanov, A. M. (2010). Mechanism of inactivation of influenza viruses by immobilized hydrophobic polycations. Proceedings of the National Academy of Sciences, 108 (1), 61-66; Botequim, D.; Maia, J.; Lino, M. M. F.; Lopes, L. M. F.; Simões, P. N.; Ilharco, L. M.; Ferreira, L. (2012): Nanoparticles and surfaces presenting antifungal, antibacterial and antiviral properties. In: Langmuir: the ACS journal of surfaces and colloids 28 (20), pp. 7646-7656).

Recent studies indicate that hydrophobic polycations render surfaces permanently antiviral. The mechanism of influenza virus inactivation by polycations has recently been demonstrated (FIG. 5). The viruses adhere (by means of hydrophobic and electrostatic interactions) to the hydrophobic polycationic surfaces. Subsequently, structural damage occurs, and associated with this is viral inactivation. Subsequently, viral RNA is released while proteins remain adsorbed. As a result, infectivity is lost. A similar mechanism of action is assumed for quaternary phosphonium compounds.

3) Immobilization of Silver Nanoparticles (Ag—NP)

In general, the biocidal activity of Ag—NP is based on (1) the formation of free radicals that damage bacterial membranes, (2) interactions with DNA, (3) adhesion to the cell surface that alters membrane properties, and (4) by damaging enzymes (see FIG. 6). For example, Ag—NP inhibit HSV (herpex simplex virus)-1 infections by blocking the adhesion and thus the entry of the virus into the cells and/or by preventing the spread of the virus from cell to cell (Literature: Akbarzadeh, Abolfazl; Kafshdooz, Leila; Razban, Zohre; Dastranj Tbrizi, Ali; Rasoulpour, Shadi; Khalilov, Rovshan et al. (2018): An overview application of silver nanoparticles in inhibition of herpes simplex virus. In: Artificial cells, nanomedicine, and biotechnology 46 (2), pp. 263-267).

Ag—NPs also exhibit antiviral activity against HIV-1, hepatitis B virus, respiratory syncytial virus, and Monkeypox virus (Literature: Ge, Liangpeng; Li, Qingtao; Wang, Meng; Ouyang, Jun; Li, Xiaojian; Xing, Malcolm M. Q. (2014): Nanosilver particles in medical applications: synthesis, performance, and toxicity. In: International journal of nanomedicine 9, pp. 2399-2407; Galdiero, Stefania; Falanga, Annarita; Vitiello, Mariateresa; Cantisani, Marco; Marra, Veronica; Galdiero, Massimiliano (2011): Silver nanoparticles as potential antiviral agents. In: Molecules (Basel, Switzerland) 16 (10), pp. 8894-8918).

It has been observed that Ag—NP exhibit higher antiviral activity than silver ions. Although the mechanism underlying their virus-inhibiting activity is not yet fully understood, Ag—NP could be considered a broad-spectrum agent against a variety of viral strains. Furthermore, viruses do not tend to develop resistance to Ag—NP.

Unfortunately, it has turned out that even today there is a great danger from pathogenic microorganisms and viruses, as most recently demonstrated by the severe acute respiratory syndrome coronavirus 2 (SARS-COV-2) and the Covid-19 disease caused by this virus, in particular with regard to their rapid spread, so that there is a great need to provide surfaces of articles with biocidal properties effectively and as permanently as possible (in particular durable or abrasion-resistant) with biocidal properties in order to prevent or at least slow down the transmission of pathogens such as coronaviruses as far as possible.

Objects of the Invention

Therefore, there may be a need to provide articles having a biocidal coating which is effective and as durable as possible (in particular durable or abrasion-resistant) and may be capable of significantly reducing the microbial count on the surface or specifically deactivating viruses.

SUMMARY OF THE INVENTION

The inventors of the present invention have found that the free functional groups on the surface of polymers, such as in particular photopolymers, unreacted during a polymerization reaction (which is usually not quantitative) may be suitably used for coupling antimicrobially or antivirally active substances.

Accordingly, the present invention relates to an article (hereinafter also referred to as a "coated article") comprising (or consisting (essentially) of) a polymer, in particular a photopolymer, having a biocidal coating, wherein a biocidal component (a biocidal agent) adheres (is bonded, bound) to the polymer by means of a (free, unreacted) functional group of the polymer.

The present invention further relates to a method of coating (hereinafter also referred to as "coating process") an article comprising (or consisting (essentially) of) a polymer, in particular a photopolymer, which method comprises applying a biocidal component (a biocidal agent) to the polymer, wherein the polymer comprises a (free, unreacted) functional group, and effecting a reaction such that the biocidal component adheres (is bonded, bound) to the polymer by means of the (free, unreacted) functional group of the polymer.

Furthermore, the present invention relates to an article (hereinafter also referred to as "coated article") comprising (or consisting (essentially) of) a polymer, in particular a photopolymer, having a biocidal coating, obtainable (or obtained) by a coating process having the above features.

Furthermore, the present invention relates to the use of a biocidal coating (or a coating comprising a biocidal component) adhering to a surface of a polymer by means of a (free, unreacted) functional group of the polymer for reducing a microbial, in particular bacterial and/or viral, load.

Further objects and advantages of embodiments of the present invention will become apparent with reference to the following detailed description and the accompanying figures.

DETAILED DESCRIPTION OF THE INVENTION

Figure 1:
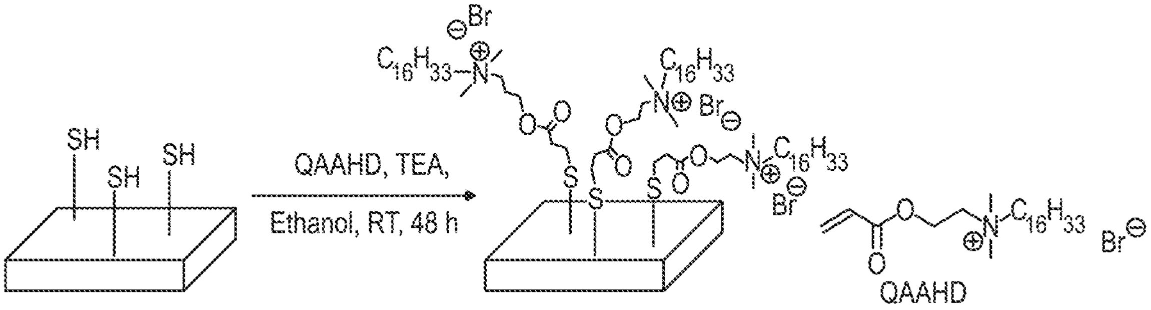
FIG. 1 illustrates an immobilization of quaternary ammonium compounds by a thiol-Michael addition reaction according to an exemplary embodiment.

Hereinafter, details of the present invention and further embodiments thereof will be described. However, the present invention is not limited to the following detailed description, but is rather only for illustrative purposes of the inventive teachings.

It should be noted that features described in connection with an exemplary embodiment may be combined with any other exemplary embodiment. In particular, features described in connection with an exemplary embodiment of a coated article according to the invention may be combined with any other exemplary embodiment of a coated article according to the invention, as well as with any exemplary embodiment of a coating process according to the invention, as well as any exemplary embodiment of a use according to the invention, and vice versa, unless specifically stated otherwise.

Where an indefinite or definite article is used when referring to a singular term, such as "a", "an" or "the", a plural of that term is also included and vice versa, unless the context clearly dictates otherwise.

Within the meaning of the present application, "biocidal" is generally understood to mean the property of killing organism, in particular microorganisms, such as bacteria or viruses, or at least controlling or limiting their growth. More particularly, in the context of the present application, "biocidal" is understood to mean an antimicrobial and/or antiviral activity or property, and may in particular be understood to mean a bacteriostatic, bactericidal, virostatic and/or virucidal activity or property, including a (virostatic and/or virucidal activity) against coronaviruses (family Coronaviridae), such as severe acute respiratory syndrome coronavirus 2 (SARS-COV-2).

According to an exemplary embodiment, the article comprises a polymer on at least one surface thereof. The article may also consist essentially of a polymer, apart from the coating or in the uncoated state.

According to an exemplary embodiment, the polymer is a photopolymer. A "photopolymer" within the meaning of the present application is generally understood to mean a polymer formed by photo-induced (i.e., electromagnetic radiation, such as UV) polymerization of mono-, bi-, or multi-functional monomers or oligomers.

According to an exemplary embodiment, the photopolymer was obtained by a (free) radical polymerization of unsaturated monomers. Suitable monomers for this purpose may in particular be acrylates, methacrylates, vinyl esters, vinyl carbonates, vinyl ethers, allyl ethers, acrylamides and combinations thereof.

According to an exemplary embodiment, the photopolymer was obtained by a thiol-ene/yne polymerization, such as by a reaction of multifunctional thiols with unsaturated monomers, in particular alkenes and/or alkynes.

According to an exemplary embodiment, the photopolymer was obtained by a cationically induced polymerization. Suitable monomers for this purpose may in particular be vinyl ethers, epoxides, oxetanes and combinations thereof.

According to an exemplary embodiment, the photopolymer was obtained by an anionic polymerization, such as a thiol-Michael reaction.

Combinations of the above-mentioned polymerization types or polymerization mechanisms are also possible.

According to an exemplary embodiment, the functional group of the polymer (to which the biocidal component adheres or is bound) is a functional group unreacted (i.e. that is/was not reacted) during polymerization. Generally, polymerization reactions of monomers and/or oligomers do not proceed quantitatively (i.e., not completely, not 100%), leaving free functional groups unreacted during polymerization and that can be used preferentially in accordance with the invention to adhere, couple, or bind a biocidal component to the polymer or article formed therefrom. Figuratively speaking, these functional groups may serve as docking sites for the biocidal component.

Suitable examples of the polymer functional group (i.e. the functional group of the polymer) to which the biocidal component adheres or is bound include a thiol group, an acrylate group, a methacrylate group, a vinyl group (such as vinyl ether, vinyl ester, vinyl carbonate), an allyl group, an epoxide group, an isocyanate group, an isothiocyanate group, an oxetane group, and combinations thereof.

According to an exemplary embodiment, the biocidal component comprises metal particles, in particular metal nanoparticles (for example with an average particle diameter of 1 to 1000 nm, in particular 2 to 500 nm). Suitable metals for this purpose may comprise in particular copper and/or silver, as well as any other biocidally active metals or metal alloys.

According to an exemplary embodiment, the biocidal component comprises a quaternary compound. Suitable examples thereof include a quaternary ammonium compound and/or a quaternary phosphonium compound. The quaternary compound may also include a polycation, in particular a hydrophobic polycation.

According to an exemplary embodiment, the biocidal component may be covalently bonded to the polymer and/or may adhere to the polymer via an organometallic bond. In this way, a particularly durable, in particular abrasion-resistant, biocidal coating may be obtained.

Figure 2:
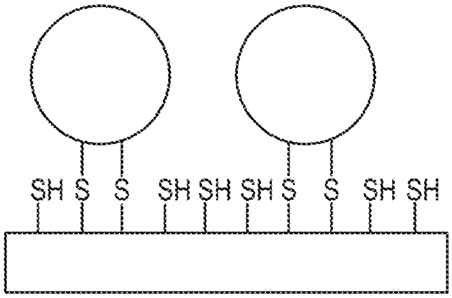
FIG. 2 illustrates immobilized Cu-nanoparticles on the surface of a thiol/ene photopolymer according to an exemplary embodiment.

According to an exemplary embodiment, the biocidal component may be directly bonded to a polymer functional group unreacted during polymerization, as illustrated, for example, in FIG. 2, which is discussed in further detail below.

Figure 3:
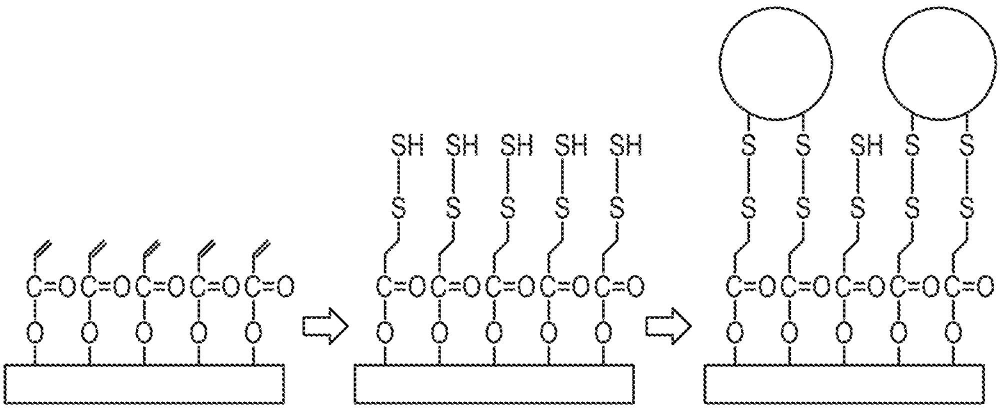
FIG. 3 illustrates the introduction of thiol-anchor groups (so-called intermediate groups) onto acrylate-based photopolymers and the subsequent immobilization of metal nanoparticles according to an exemplary embodiment.
Figure 4:
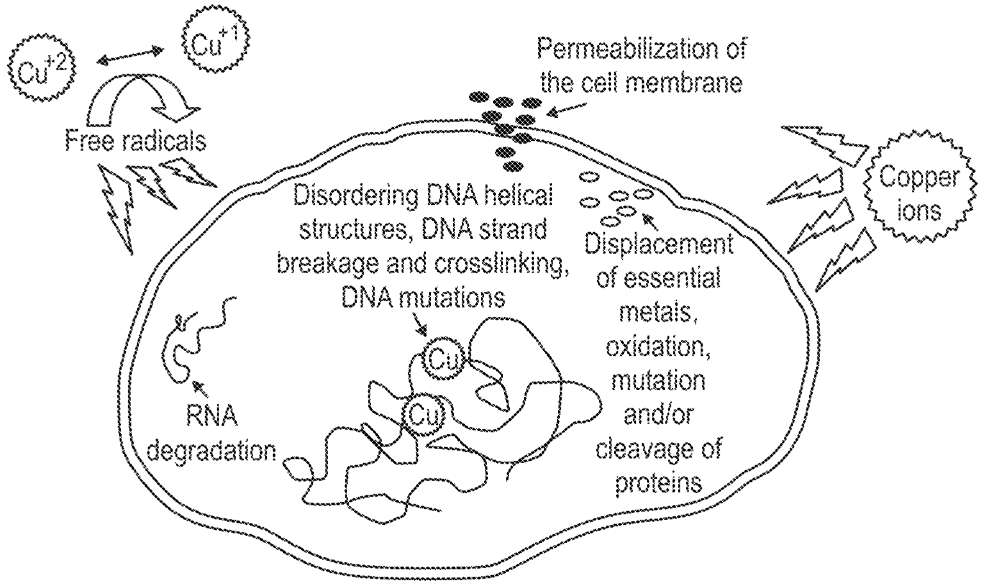
FIG. 4 illustrates different mechanisms of toxicity of copper to microorganisms.
Figure 5:
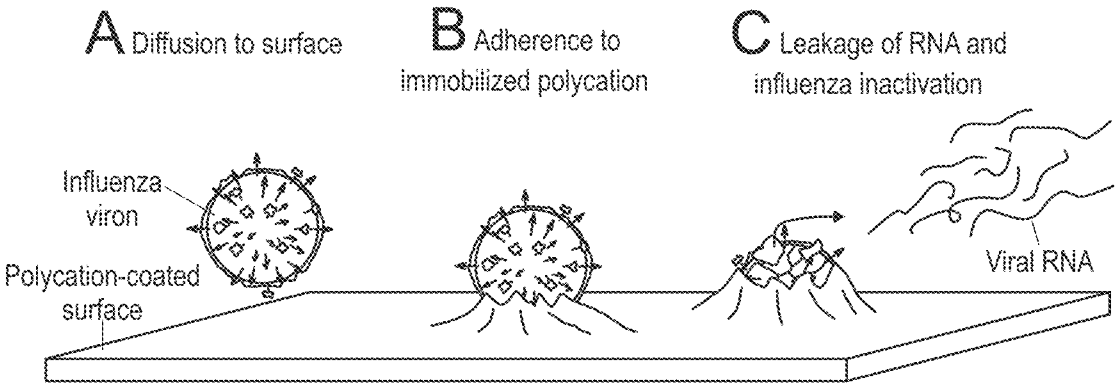
FIG. 5 illustrates mechanisms of damage to viruses by coatings with polycations.
Figure 6:
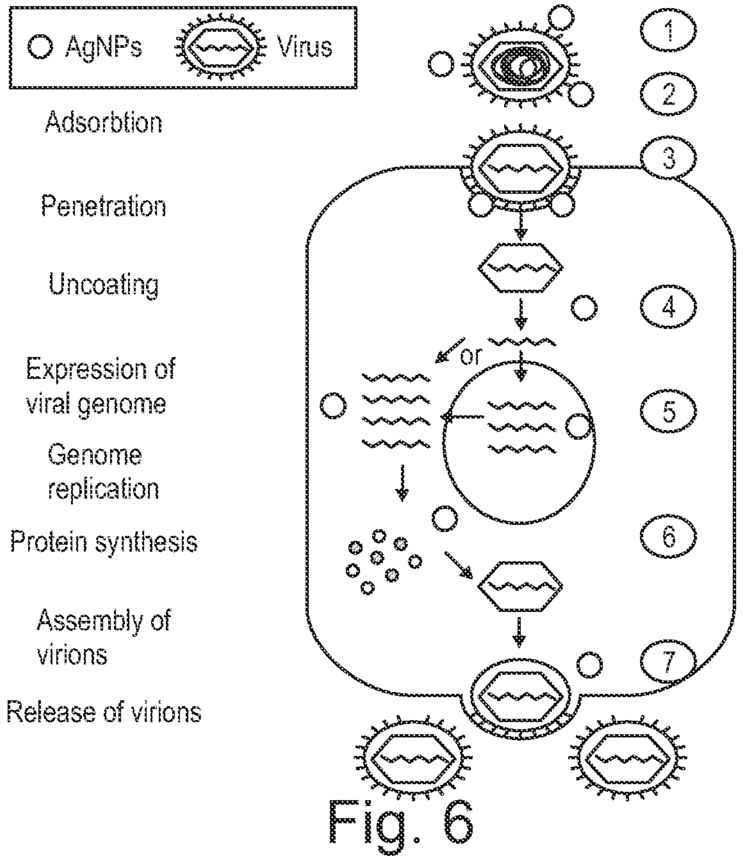
FIG. 6 illustrates mechanisms of antiviral activity of silver nanoparticles (Ag—NP).

According to another exemplary embodiment, the biocidal component may be bonded to a polymer functional group unreacted during polymerization via an intermediate group (which may also be referred to as a spacer or a linker), as illustrated, for example, in FIG. 3, which is explained in more detail below. This may be in particular advantageous if the polymer functional group unreacted during polymerization has a low affinity or binding tendency to the biocidal component. In this case, the intermediate group may be referred to in particular as a linker. However, it may also be advantageous for steric reasons to couple the biocidal component not directly to a polymer functional group unreacted during polymerization, but via an intermediate group. In such a case, the intermediate group may in particular be referred to as a spacer. Of course, several (for example different) intermediate groups may also be used, which may be arranged in parallel (for example, one or more different polymer functional groups unreacted during polymerization may be linked to different intermediate groups and/or one or more different biocidal components may be linked to different intermediate groups) and/or in series (for example, a biocidal component may be linked to a polymer functional group unreacted during polymerization via several interconnected intermediate groups (i.e. via a chain of intermediate groups).

According to an exemplary embodiment, the intermediate group is configured to improve adhesion (bonding) of the biocidal component to the polymer functional group unreacted during polymerization. This may be in particular advantageous if the polymer functional group unreacted during polymerization has a low affinity or binding tendency to the biocidal component.

According to an exemplary embodiment, the intermediate group comprises at least two functional groups, which may be the same or different, wherein one of the at least two functional groups is linked to the polymer functional group unreacted during the polymerization and another of the at least two functional groups is linked to the biocidal component. In this way, in particular, an improvement in the adhesion (bonding) of the biocidal component to the polymer functional group unreacted during the polymerization may be realized, which is in particular advantageous if the polymer functional group unreacted during the polymerization has a low affinity or binding tendency to the biocidal component.

It is also possible that a portion of the biocidal component (for example, a first biocidal component) is directly bonded to a polymer functional group unreacted during polymerization and another portion of the biocidal component (for example, a second biocidal component that is different from the first biocidal component) is bonded to a polymer functional group unreacted during polymerization via an intermediate group.

The method of coating an article comprising a polymer, in particular a photopolymer, comprises the following steps:

applying a biocidal component to the polymer, wherein the polymer comprises a functional group, and effecting a reaction so that the biocidal component adheres or is bound (attached) to the polymer by means of the functional group of the polymer.

According to an exemplary embodiment, the polymer is a photopolymer.

According to an exemplary embodiment, the photopolymer was obtained by at least one of the following polymerization types or polymerization mechanisms prior to application of the biocidal component. Accordingly, prior to applying a biocidal component to the polymer, a method according to the invention may also comprise a step of preparing a polymer by polymerization, in particular according to one of the following polymerization types or polymerization mechanisms:

According to an exemplary embodiment, the photopolymer is prepared by a radical polymerization of unsaturated monomers. Suitable monomers for this purpose may in particular be acrylates, methacrylates, vinyl esters, vinyl carbonates, vinyl ethers, allyl ethers, acrylamides and combinations thereof.

According to an exemplary embodiment, the photopolymer is prepared by a thiol-ene/yne polymerization, such as by a reaction of multifunctional thiols with unsaturated monomers, in particular alkenes and/or alkynes.

According to an exemplary embodiment, the photopolymer is prepared by a cationically induced polymerization. Suitable monomers for this purpose may in particular be vinyl ethers, epoxides, oxetanes and combinations thereof.

According to an exemplary embodiment, the photopolymer is prepared by an anionic polymerization, such as a thiol-Michael reaction.

Combinations of the above-mentioned polymerization types or polymerization mechanisms are also possible.

According to an exemplary embodiment, the functional group of the polymer (to which the biocidal component is bonded) is a functional group unreacted during polymerization (a functional group that was not reacted during polymerization). Generally, polymerization reactions of monomers and/or oligomers do not proceed quantitatively (i.e., not completely, not 100%), leaving free functional groups unreacted during polymerization, and which can be used preferentially in accordance with the invention to adhere, couple, or bind a biocidal component to the polymer or article formed therefrom.

Suitable examples of the polymer functional group to which the biocidal component adheres or is bonded include a thiol group, an acrylate group, a methacrylate group, a vinyl group (such as vinyl ether, vinyl ester, vinyl carbonate), an allyl group, an epoxide group, an isocyanate group, an isothiocyanate group, an oxetane group, and combinations thereof.

According to an exemplary embodiment, the biocidal component comprises metal particles, in particular metal nanoparticles (for example with an average particle diameter of 1 to 1000 nm, in particular 2 to 500 nm). Suitable metals for this purpose may comprise in particular copper and/or silver, as well as any other biocidally active metals or metal alloys.

According to an exemplary embodiment, the biocidal component comprises a quaternary compound. Suitable examples thereof include a quaternary ammonium compound and/or a quaternary phosphonium compound. The quaternary compound may also include a polycation, in particular a hydrophobic polycation.

The step of applying a biocidal component to the polymer is not particularly limited and any suitable application technique may be used. For example, the application may be carried out by spraying, brushing, rolling, doctoring (coating with a doctor blade) and/or gunning the biocidal component onto a surface of the polymer or the article. In this regard, it may be advantageous if the biocidal component is present or applied in liquid form, for example dissolved or dispersed in a solvent. A dip coating of the polymer or the article is also possible.

The step of effecting a reaction is not particularly limited as long as the biocidal component subsequently adheres or is bound to the polymer or article. For example, in some cases, a reaction with the polymer functional group can occur spontaneously once the biocidal component is applied to the polymer, or by allowing it to stand for a period of time. In some cases, a reaction may be effected by a change in temperature (in particular heating), by irradiation (for example, with UV light, electron radiation, or X-rays), or by microwaves for a period of time, as would be apparent to one skilled in the art based on his or her knowledge of the art, depending on the reactants used.

According to an exemplary embodiment, the biocidal component may be covalently bonded to or adhere to the polymer by the reaction and/or is bonded to the polymer via an organometallic bond. In this way, a particularly durable, in particular abrasion-resistant, biocidal coating may be obtained.

According to an exemplary embodiment, the biocidal component may be directly bonded to a polymer functional group unreacted during polymerization by the reaction, as illustrated, for example, in FIG. 2, discussed in further detail below.

According to another exemplary embodiment, prior to the step of applying the biocidal component to the polymer, the biocidal component may be provided with an intermediate group (which may also be referred to as a spacer or a linker) which, upon reaction, is reacted (reacts) with a polymer functional group unreacted during polymerization. Accordingly, prior to applying a biocidal component to the polymer, a method according to the invention may also comprise a step of reacting or modifying the biocidal component with an intermediate group.

According to another exemplary embodiment, prior to the step of applying the biocidal component to the polymer, a functional group (unreacted during polymerization) of the polymer may be provided with an intermediate group which, upon reaction, is reacted (reacts) with the biocidal component. Accordingly, prior to applying a biocidal component to the polymer, a method according to the invention may also comprise a step of reacting or modifying a functional group (unreacted during polymerization) of the polymer with an intermediate group, as illustrated, for example, in FIG. 3, which is explained in further detail below.

Such an intermediate group may be in particular advantageous if the polymer functional group unreacted during polymerization has a low affinity or binding tendency to the biocidal component. In this case, the intermediate group may in particular be referred to as a linker. However, it may also be advantageous for steric reasons to couple the biocidal component not directly to a polymer functional group unreacted during polymerization, but via an intermediate group. In such a case, the intermediate group may in particular be referred to as a spacer. Of course, several (for example different) intermediate groups may also be used, which may be arranged in parallel (for example, one or more different functional groups of the polymer unreacted during polymerization may be linked to different intermediate groups and/or one or more different biocidal components may be linked to different intermediate groups) and/or in series (for example, a biocidal component may be linked to a polymer functional group unreacted during polymerization via several interconnected intermediate groups (i.e. via a chain of intermediate groups).

According to an exemplary embodiment, the intermediate group is configured to improve adhesion (bonding) of the biocidal component to the polymer functional group unreacted during polymerization. This may be in particular advantageous if the polymer functional group unreacted during polymerization has a low affinity or binding tendency to the biocidal component.

According to an exemplary embodiment, the intermediate group comprises at least two functional groups, which may be the same or different, wherein one of the at least two functional groups is linked (bonded) to the polymer functional group unreacted during the polymerization, and another of the at least two functional groups is linked (bonded) to the biocidal component. In this way, in particular, an improvement in the adhesion (bonding) of the biocidal component to the polymer functional group unreacted during the polymerization may be realized, which is in particular advantageous if the polymer functional group unreacted during the polymerization has a low affinity or binding tendency to the biocidal component.

It is also possible that a portion of the biocidal component (for example, a first biocidal component) is directly bonded to a polymer functional group unreacted during polymerization, and another portion of the biocidal component (for example, a second biocidal component that is different from the first biocidal component) is bonded to a polymer functional group unreacted during polymerization via an intermediate group.

According to an exemplary embodiment, the coated article, is obtainable by a coating process as described above.

The present invention further relates to the use of a biocidal coating (or a coating comprising a biocidal component) adhering to a surface of a polymer by means of a (free, unreacted) functional group of the polymer, for reducing a microbial, in particular bacterial and/or viral, load.

According to an exemplary embodiment, the biocidal coating is produced by a coating process as described herein. Also, any further details regarding the polymer and the biocidal component as described above may apply to the use according to the invention.

According to an exemplary embodiment, the biocidal coating is used to deactivate viruses.

According to an exemplary embodiment, the viral load or viruses include RNA viruses, in particular coronaviruses.

According to an exemplary embodiment, the viral load or viruses include severe acute respiratory syndrome coronavirus 2 (SARS-COV-2).

The present invention will be further described with reference to the following examples, which, however, are merely illustrative of the teachings of the invention and are in no way intended to limit the scope of the present invention.

EXAMPLES

For example, functional groups on surfaces of photopolymers can be exploited for immobilization of antimicrobial/antiviral quaternary ammonium or phosphonium compounds. For example, as shown in FIG. 1, it is possible to derivatize quaternary ammonium compounds with acrylate groups and couple them to the surface of the photopolymer by a reaction with the free thiol groups (thiol-Michael addition reaction).

Alternatively, free acrylate, methacrylate, vinyl ether, vinyl ester, or vinyl carbonate groups can be used on the photopolymer surface to immobilize mercapto-, amino-, or hydroxy-functionalized quaternary ammonium compounds using Michael addition reactions. Furthermore, a Diels-Alder reaction can also be used to immobilize functionalized (e.g., with pyrimidyltetrazine, furan, cyclopentadiene groups) quaternary ammonium or phosphonium compounds on unsaturated functional groups (e.g., acrylate, methacrylate) on the surface of photopolymers. It is also possible to immobilize amino- or thiol-functionalized quaternary ammonium compounds to free epoxide, isocyanate, isothiocyanate, oxetane groups on surfaces of photopolymers. The above reactions can also be carried out with suitably functionalized phosphonium compounds.

Furthermore, it is known that free mercapto groups have a very high affinity for metals. This principle can be used for the immobilization of antimicrobial/antiviral metal (Cu, Ag, Zn) nanoparticles (see FIG. 2).

Furthermore, it is possible to introduce anchor groups for antimicrobial/antiviral substances/molecules by modifying the free functional groups on the surface. For example, free acrylate groups can be modified by a Michael addition reaction with multifunctional thiols (e.g. DiPETMP, PETMP, TMPMP, GDMP), and thereby functionalized with mercapto groups on the surface. These mercapto groups can be used to immobilize antimicrobial/antiviral substances (quaternary ammonium compounds and phosphonium compounds, copper or silver nanoparticles) (see FIG. 3).

Production of Copper Nanoparticles (CuNP)

For the preparation of photopolymer coating with virucidal properties, copper nanoparticles (CuNP) were prepared in the first step according to the method of J. Xiong et. al. (J. Xiong, Y. Wang, Q. Xue, X. Wu, Green Chem., 2011, 13, 900, "Synthesis of highly stable dispersion of nanosized copper particles using L-ascorbic acid"). The aqueous CuNP solution was subsequently used to coat a photopolymer.

Manufacture of the Photopolymer Test Specimens

Figure 7:
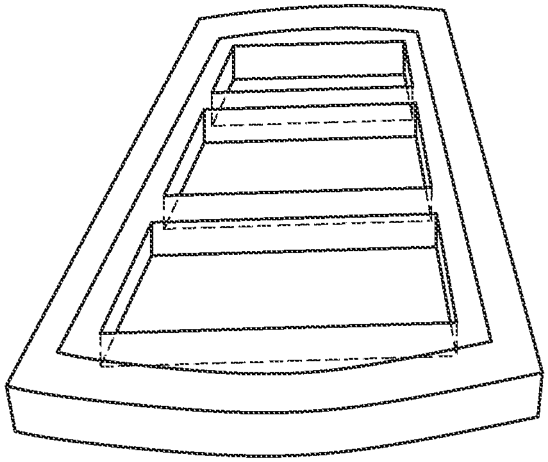
FIG. 7 shows silicone molds that were used to prepare photopolymer test specimens.

In the next step, a resin formulation consisting of 114.08 g of pentaerythritol tetrakis(3-mercaptopropionate), 64.61 g of 1,3,5-triallyl-1,3,5-triazine-2,4,6-(1H,3H,5H)-trione and 2.72 g of ethyl (2,4,6-trimethylbenzoyl) phenyl phosphinate was prepared, which was poured into silicone molds (see FIG. 7) and then cured using UV light.

Figure 8:
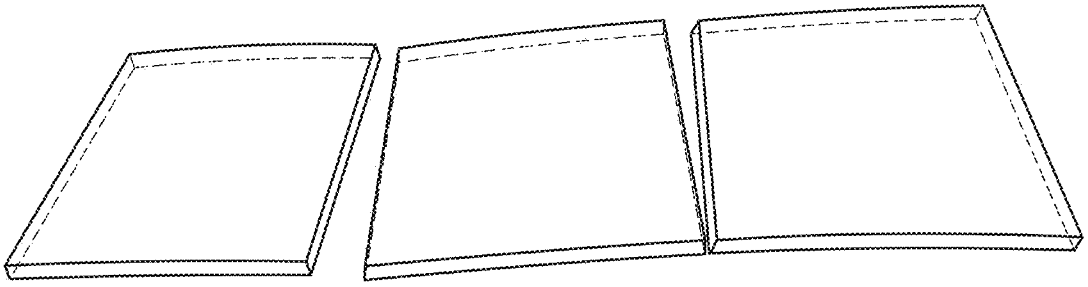
FIG. 8 shows photopolymer test specimens that were prepared using the silicone molds shown in FIG. 7.

Following ISO 18071/ISO 21702 and ISO 22196, planar samples with a size of l=50 mm, w=50 mm, h=4 mm were produced (see FIG. 8).

Coating of the Photopolymer Test Specimens with CuNP

Figure 9:
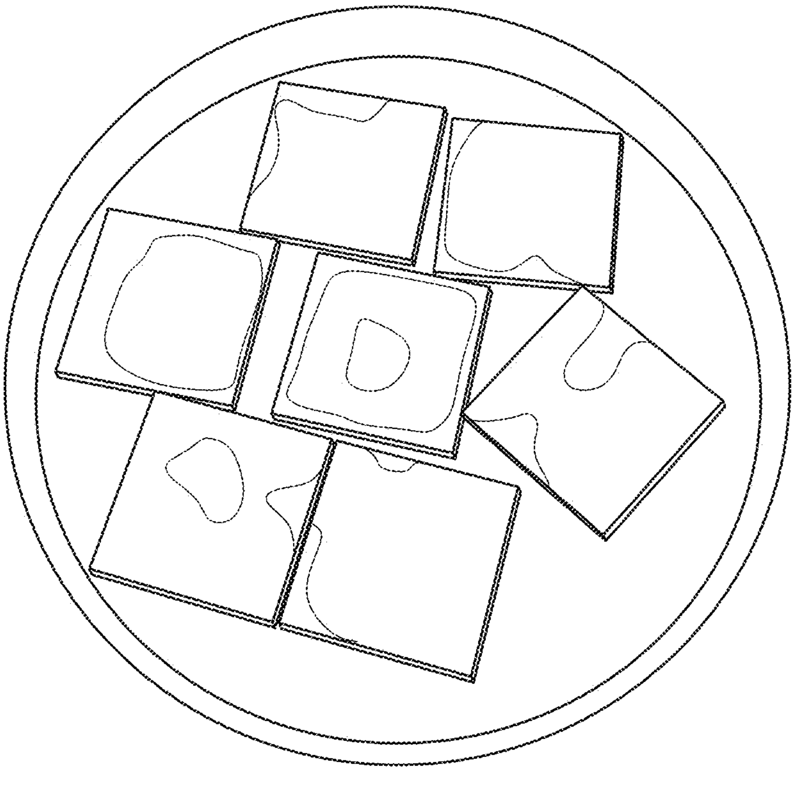
FIG. 9 shows test specimens placed in aqueous CuNP solution.

The coating was applied by placing the test specimens in the aqueous CuNP solution for 72 h at room temperature (see FIG. 9). After this, the test specimens were rinsed with deionized $H_2O$.

The binding of CuNP to the photopolymer surface was detected by X-ray photoelectron spectroscopy. It is assumed that the CuNPs bind to the free mercapto groups on the photopolymer surface.

Testing of the Virucidal Properties of the Coated Photopolymer According to ISO 18071 and ISO 21702

In order to prevent contamination of the samples with environmental germs as far as possible, all test specimens (reference (without CuNP) and coated test specimens) were rinsed with ethanol and dried before testing. For testing the virucidal properties of the coated test specimen (I-CuNP-MUL), the bacteriophage Qbeta (ssRNA genome, model phage for rhinoviruses, noroviruses), as well as the enveloped bacteriophage Phi6 (ds RNA genome, model phage for SARS-COV-2, Ebola; influenza) were used. The assessment of antiviral properties of samples is always performed in comparison to the reference.

The test procedure for checking the antiviral properties and effectiveness was based on ISO 18071 (Fine ceramics-Determination of antiviral activity of semiconduction photocatalytic materials under indoor lighting environment) and ISO 21702 (Measurement of antiviral activity on plastics and other non-porous surfaces). All tests were performed in 3-fold determination. The mean values of the results obtained for the antiviral activity are summarized in Table 1 below.

TABLE 1

Determined antiviral efficacy of the coated test specimen (I-CuNP-MUL) compared to the reference (photopolymer uncoated).

| Sample | Tested microorganisms | Application amount Microorganisms | Exposure time | Reduction in % |
|---|---|---|---|---|
| Photopolymer uncoated (=reference) | Qbeta DSM 13768 | 6.75E+06 PFU | 30 min | 11.40 |
| | | | 24 h | 97.96 |
| I-CuNP-MUL | Qbeta DSM 13768 | 5.78E+06 PFU | 30 min | 90.94* |
| | | | 24 h | 100.00 |
| Photopolymer uncoated (=reference) | Phi6 DSM 21518 | 3.75E+06 PFU | 30 min | — |
| | | | 24 h | 99.97 |
| I-CuNP-MUL | Phi6 DSM 21518 | 4.20E+06 PFU | 30 min | 100.00 |
| | | | 24 h | 100.00 |

Abbreviation: PFU . . . plaque forming units;

*2 of 3 of the tested samples showed a 100.00% reduction in the amount of microorganisms, one sample showed a 72.83% reduction.

The results showed that the samples coated with CuNP (I-CuNP-MUL) showed antiviral efficacy after 30 min compared to the reference (see Table 1).

After 30 min, the bacteriophages Qbeta DSM 13768 and Phi6 DSM 21518 were reduced by 90.94% and 100.00%, respectively, in the presence of photopolymer I-CuNP-MUL. A 100% reduction of the bacteriophage Qbeta DSM 13768 in the presence of the coated sample was not achieved due to a superficial inhomogeneity of one sample (2 out of 3 tested samples showed a 100.00% reduction in the amount of microorganisms, one sample showed a 72.83% reduction).

The present invention has been described with reference to specific embodiments and examples. However, the invention is not limited thereto and various modifications thereof are possible without departing from the scope of the present invention.

The invention claimed is:

1. An article comprising a polymer having a biocidal coating, wherein a biocidal component adheres to the polymer by means of a functional group of the polymer,
 wherein the polymer is a photopolymer obtained by a thiol-ene/yne polymerization, and
 wherein the thiol-ene/yne polymerization is a reaction of a multifunctional thiol with at least one of an alkene or an alkyne.

2. The article according to claim 1, wherein the functional group of the polymer is a functional group unreacted during polymerization.

3. The article according to claim 1, wherein the functional group of the polymer is selected from the group consisting of a thiol group, an acrylate group, a methacrylate group, a vinyl group, an allyl group, and combinations thereof.

4. The article according to claim 1, wherein the biocidal component comprises metal particles.

5. The article according to claim 1, wherein the biocidal component comprises a quaternary compound.

6. The article according to claim 1, wherein the biocidal component is covalently bonded to the polymer and/or is bonded to the polymer via an organometallic bond.

7. The article according to claim 1, wherein the biocidal component is directly bonded to a polymer functional group unreacted during polymerization.

8. The article according to claim 1, wherein the biocidal component is bonded via an intermediate group to a polymer functional group unreacted during polymerization.

9. The article according to claim 8, wherein the intermediate group comprises at least two different functional groups, wherein one of the at least two functional groups is linked to the polymer functional group unreacted during polymerization and another of the at least two functional groups is linked to the biocidal component.

10. A method of coating an article comprising a polymer, the method comprising the steps of:
 applying a biocidal component to the polymer, wherein the polymer is a photopolymer obtained by a thiol-ene/yne polymerization, wherein the thiol-ene/yne polymerization is a reaction of a multifunctional thiol with at least one of an alkene or an alkyne, wherein the polymer comprises a functional group, and
 effecting a reaction so that the biocidal component adheres to the polymer by means of the functional group of the polymer.

11. The method according to claim 10, wherein the functional group of the polymer is a functional group unreacted during polymerization;
 and/or wherein the functional group of the polymer is selected from the group consisting of a thiol group, an acrylate group, a methacrylate group, a vinyl group, an allyl group, and combinations thereof;

and/or wherein the biocidal component comprises metal particles;

and/or wherein the biocidal component comprises a quaternary compound;

and/or wherein the biocidal component is covalently bonded to the polymer by the reaction and/or is bonded to the polymer via an organometallic bond;

and/or wherein the biocidal component is directly bonded to a polymer functional group unreacted during polymerization by the reaction.

12. The method according to claim 10, wherein, prior to the step of applying the biocidal component to the polymer, the biocidal component is provided with an intermediate group which, upon reaction, is reacted with a polymer functional group unreacted during polymerization.

13. The method according to claim 10, wherein, prior to the step of applying the biocidal component to the polymer, a functional group of the polymer is provided with an intermediate group which, upon reaction, is reacted with the biocidal component.

14. A method of using a biocidal coating adhering to a surface of a polymer by means of a functional group of the polymer for reducing a microbial load, wherein the polymer is a photopolymer obtained by a thiol-ene/yne polymerization, wherein the thiol-ene/yne polymerization is a reaction of a multifunctional thiol with at least one of an alkene or an alkyne.

15. The method of using according to claim 10 for deactivating viruses.

16. The method of using according to claim 14, wherein the load or the viruses comprise RNA viruses.

17. The method of using according to claim 14, wherein the microbial load or the viruses include severe acute respiratory syndrome coronavirus 2.

* * * * *